May 8, 1951 D. E. SUNSTEIN 2,552,232

AUTOMATIC GAIN CONTROL

Filed March 27, 1946 2 Sheets-Sheet 1

INVENTOR.
DAVID E. SUNSTEIN
BY [signature]
AGENT

AUTOMATIC GAIN CONTROL

Filed March 27, 1946 2 Sheets-Sheet 2

INVENTOR.
DAVID E. SUNSTEIN
BY [signature]
AGENT

Patented May 8, 1951

2,552,232

UNITED STATES PATENT OFFICE 2,552,232

AUTOMATIC GAIN CONTROL

David E. Sunstein, Cynwyd, Pa., assignor, by mesne assignments, to Philco Corporation, Philadelphia, Pa., a corporation of Pennsylvania Application March 27, 1946, Serial No. 657,405

20 Claims. (Cl. 179—171)

This invention relates to an improved automatic gain control system, particularly adapted for use in radar and related systems which for their operation rely on the reflection or reradiation of pulsed transmitted energy from objects which are relatively remote from the transmitter.

The principal object of the invention is to provide such a system affording substantially full amplification to received signals reflected from distinctive objects and superimposed on other signals received as a result of the reflection of transmitted energy from the surrounding terrain. This objective is achieved by the use of a special form of automatic gain control which effects no substantial reduction in the gain during a predetermined time interval following the arrival of the initial portion of a distinctive object-reflected pulse signal which is of substantially greater amplitude than signals reflected from the surrounding terrain. However, the system in accordance with the invention affords normal gain control as desired following this predetermined interval, and furthermore, restores substantially full gain almost immediately following the termination of the distinctive signal.

In a prior radar automatic gain control system, employing for example, a cathode follower tube, the application of full automatic gain control bias is delayed, but begins to take effect gradually from the time of arrival of the initial portion of any signal of greater than average amplitude. Likewise, following a reduction in signal to average amplitude, the bias will be removed gradually. This is undesirable as it does not afford maximum discrimination between signals from distinctive objects and those from the surrounding terrain.

Accordingly, I have found it desirable to introduce into the automatic gain control link of a radar system, a delay line or other equivalent positive delay producing means to prevent the gain control bias from taking effect during an interval of predetermined duration following the time at which the bias is actually derived from the output of the intermediate frequency amplifier stage or other suitable point in the receiver circuits. This, however, introduces certain difficulties and disadvantages which are overcome by my invention. For example, the use of such means will also delay the return of the system to normal gain upon the termination of a received signal of greater than average amplitude. Furthermore, I have found that an introduction of such means causes the automatic gain control system to become oscillatory at a period which is generally of the order of the amount of delay introduced. Neither of these effects is desirable and they are eliminated by my invention, other features and advantages of which will become apparent from a consideration of the following specifications and of the drawings in which:

Figure 1:
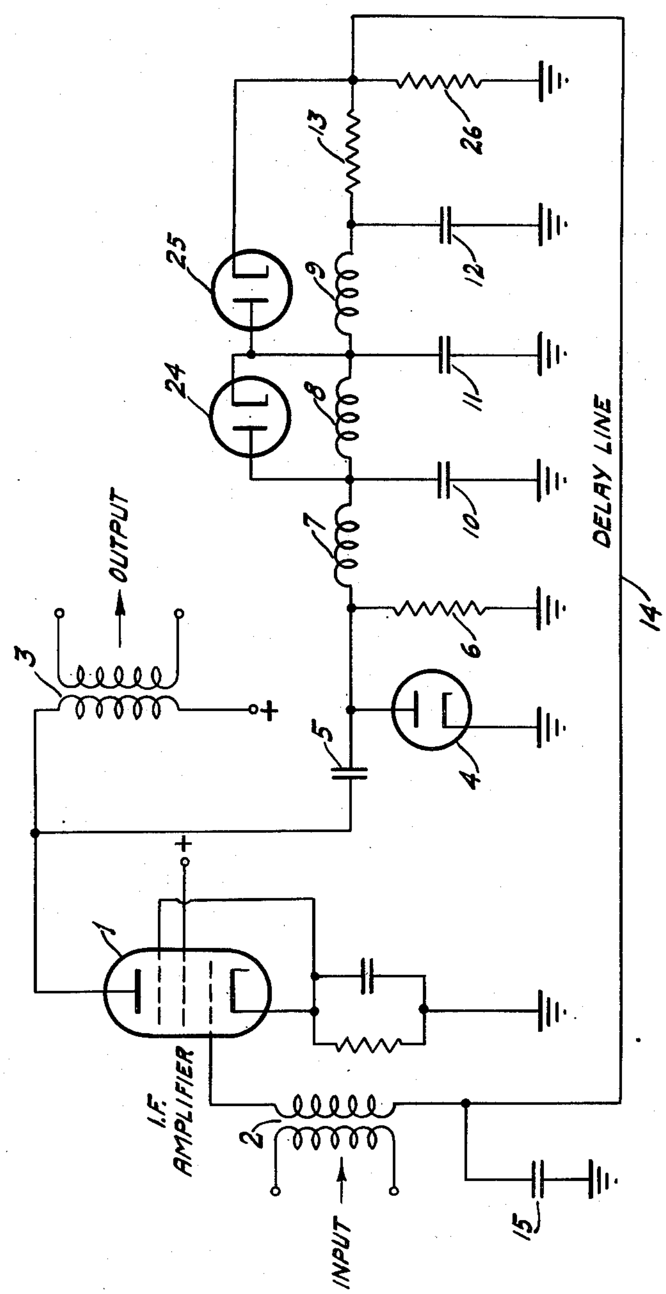
Figure 1 is a schematic diagram illustrating a representative embodiment of my invention.

Referring now to Figure 1, there is shown a portion of a conventional radar or pulse receiver provided with an automatic gain control system in accordance with my invention. In this arrangement, intermediate frequency signal derived from a preceding stage of the receiver (not shown) is supplied through transformer 2 to the grid of an intermediate frequency amplifier tube 1. The latter may be a conventional pentode type tube having a self-biasing circuit included in its cathode circuit, having its suppressor grid and cathode connected together, and having its anode and screen grid supplied with positive potential from suitable sources, as shown. Output from the plate circuit of this tube may be derived by means of transformer 3. Also connected to the output circuit, is a conventional automatic gain control detector which may comprise diode 4, condenser 5 and load impedance 6, connected as shown. In accordance with the invention, the unidirectional potential developed across load resistor 6, the magnitude of which is a function of the output level of the intermediate frequency amplifier stage, is supplied to the input terminal of a delay line comprising inductors 7, 8 and 9 and condensers 10, 11 and 12. The delay line is terminated at its output terminal in a suitable impedance, comprising resistors 13 and 26 in series, which is preferably chosen so as to minimize reflections in the line. Across this impedance there will be developed, at some later time determined by the delaying effect of the line, a unidirectional potential corresponding in magnitude to that developed across impedance 6. Preferably the delay introduced by the line may be of the order of the length of a transmitted pulse which, for a representative microwave system operating at a pulse repetition rate of from 1000–2000 per second, might be from ½ to 1μ second. A portion of this delayed control voltage derived across resistor 26 is supplied through connection 14 and the secondary of transformer 2 to bias the control grid of the intermediate frequency amplifier stage 1. The control grid of this tube may be grounded for intermediate frequencies through the secondary of transformer 2 and a small by-pass condenser 15. The function of the latter could, of course, be combined in condenser 12.

Further, in accordance with the invention, there are connected, across portions of the delay line, diodes 24 and 25, so poled that they will tend to eliminate the delay effect for decreases in the average output level of intermediate frequency amplifier 1 which produce decreases in the magnitude of the negative automatic gain control potential developed across impedance 6. As shown in Figure 1, the connections of diodes 24 and 25 may be so made as to exclude the portion of delay line comprising inductor 7, and to permit the latter to function as a radio frequency choke regardless of whether or not the diodes are conducting. Furthermore, although it will generally be desirable, if the delay line comprises a plurality of sections, to provide separate diodes to eliminate the delaying effect of each section, this is not essential. In some instances the desired result may be achieved by using a single diode for several sections or even for the entire line. When this is done, it will be particularly desirable to connect the diode cathode to an appropriate point on the impedance terminating the delay line. As will be apparent, this connection may be made so that, when the diode is conducting, the terminating impedance of the line will be modified so as to insure minimization of reflections therein. Although this becomes of less importance when several diodes are used, it is clearly shown in Figure 1.

Figure 2:
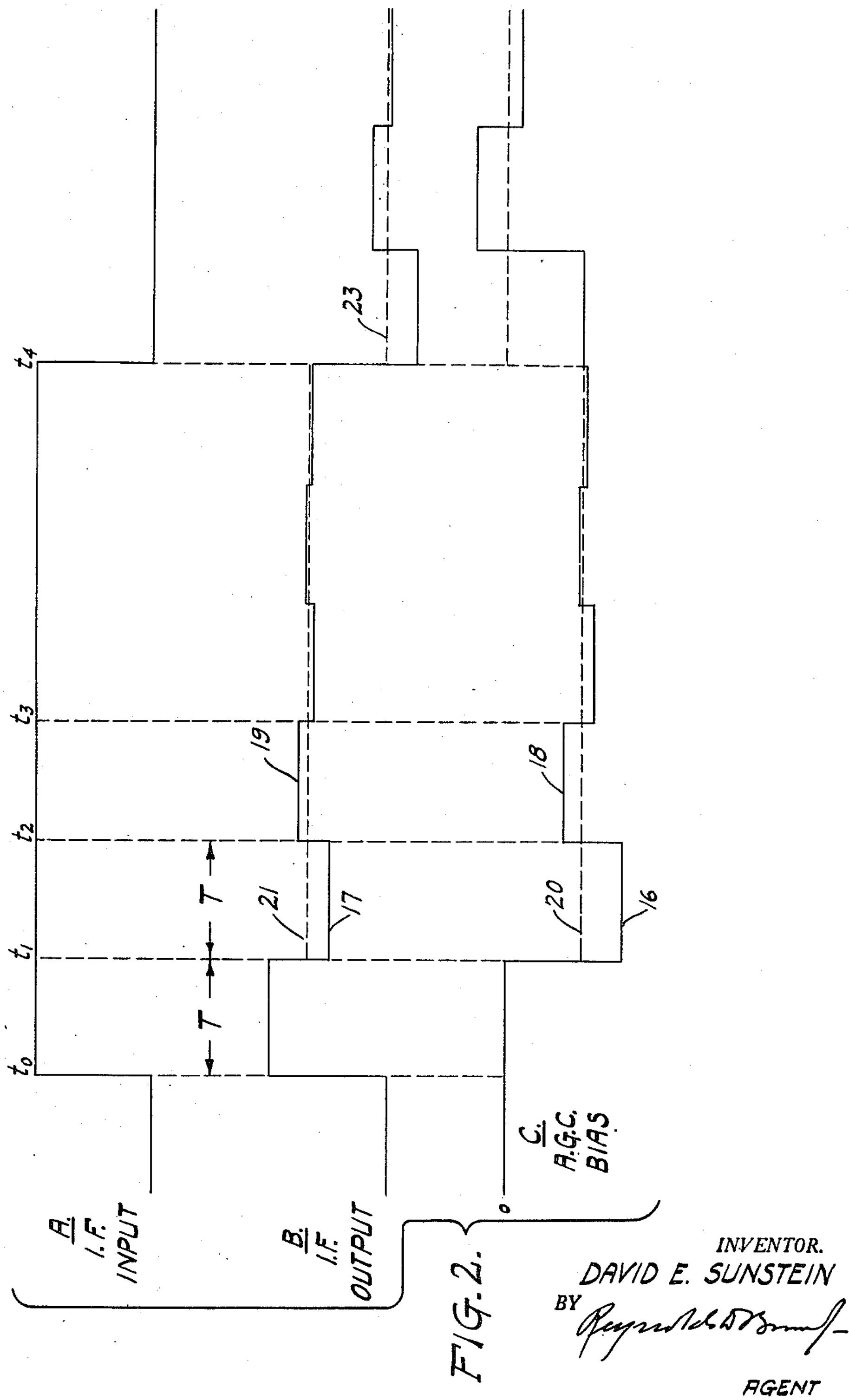
Figure 2 represents graphically the mode of operation of the invention and the disadvantages overcome by it.

The mode of operation of the automatic gain control system, in accordance with my invention, will more readily be understood by reference to Figure 2. In order to explain this mode of operation, it may be assumed initially that diodes 24 and 25 have been temporarily disconnected from the delay line. At A in Figure 2 is represented a pulse corresponding to the envelope of a received signal from a distinctive object or land-mass disconformity such as might be received in a conventional airborne radar system. The amplitude of this pulse envelope between times $t_0$ and $t_4$ corresponds to the received signal reflected from the distinctive object or land mass and may be of duration of a transmitted pulse from which the reflection results. The duration will, of course, be generally proportional to the length of the object or discontinuity. The amplitudes of the received signal prior to time $t_0$ and subsequent to time $t_4$ will be determined by reflections from the surrounding terrain (either land or water) which in general will be weaker than those from distinctive objects, the presence of which it is desired to emphasize on the indicator of the radar system. Corresponding to the amplitude of these received signals in the absence of any distinctive target, there will be developed by the automatic gain control bias which has been arbitrarily designated as 0 in C of Figure 2. This bias, applied to the grid of intermediate frequency amplifier tube 1, may be such as to produce an intermediate frequency output signal of the amplitude shown at B prior to the time $t_0$. Upon the arrival of a received signal at time $t_0$, and in the absence of the delay line shown in Figure 1, the automatic gain control bias would commence to increase to a value corresponding to the increased intermediate frequency output level, the time required for the change to be effected being determined by the constants of the A. G. C. detector circuit. The effect of the delay line, however, will be to cause the A. G. C. bias to continue, at substantially the same value which it had prior to time $t_0$, during an interval T following the arrival of the leading edge of the received pulse, T being the amount of delay introduced by the line. Thus, instead of immediately reducing the gain of intermediate frequency amplifier stage 1, that gain would be permitted to continue as it was prior to time $t_0$ so as to give full amplification to the initial portion of the received pulse signal, as shown at B in Figure 2. However, at time $t_1$ the increase in A. G. C. bias resulting from the increase in the amplitude of the received signal will begin to take effect and cause a reduction in the gain of intermediate frequency amplifier stage 1. Thus, during the interval between times $t_1$ and $t_2$, the A. G. C. bias will assume a value 16, determined by the magnitude of the intermediate frequency output during the immediately preceding interval of duration T and will cause the I.-F. output during the interval $t_1$—$t_2$ to fall to the level 17. In the immediately succeeding interval $t_2$—$t_3$, the A. G. C. bias will be determined by the I.-F. output in the interval $t_1$—$t_2$ and will correspond to that shown at 18. This represents a reduction in the magnitude of A. G. C. bias over that obtaining in the preceding interval and, assuming the I.-F. input to be of the same level as shown at A, the I.-F. output will increase somewhat to a level such as that designated 19 in B of Figure 2. It should now be apparent that the introduction of the delay line in the apparatus of Figure 1, will not only cause changes in the A. G. C. bias to be delayed with respect to changes in the intermediate frequency input signal, but also to cause the A. G. C. system, and hence the intermediate frequency output following an abrupt change in input, to be oscillatory. Although it will generally be possible to design the circuits so that these oscillations will finally die out, the effect upon the system will be undesirable and will tend to produce confusion on the indicator of the radar system with which they are employed.

This same sort of behavior will obtain upon the reduction in the amplitude of the received signal corresponding to the termination of a pulse from a distinctive object or land-mass. The nature of this behavior is clearly shown in Figure 2 by the portions of the curves subsequent to time $t_4$ and the phenomenon is not believed to require further detailed explanation. It should be understood, of course, that Figure 2 has been simplified for purposes of convenience in explanation and does not, for example, take account of the inherent time constants of the A. G. C. detector and its associated circuits. This figure does, however, clearly show the general nature of certain disadvantages overcome by the invention.

I have determined that the objectionable oscillatory behavior, above referred to, may be obviated, while retaining the desirable delay feature, by connecting, across at least a portion of the delay network, one or more diodes or other suitable unilateral conducting device, so poled as substantially to eliminate the delaying effect for all changes in the magnitude of the A. G. C. voltage corresponding to decreases in the output of the intermediate frequency amplifier stage to which the A. G. C. detector is connected. This addition to the circuit will not affect the operation of the delay line in delaying by a fixed amount the application of A. G. C. bias resulting from an increase in received signal amplitude, so as to permit full amplification of the received signal during this interval. It will, however, cause the gain of the system to be reduced to a definite value dependent upon the amplitude of the received signal, substantially immediately following this interval, and without the inception of oscillations in the automatic gain control system. Likewise, reductions in the automatic gain control bias resulting from reductions in the amplitude of the received signal will take effect immediately upon the intermediate frequency amplifier and will increase its gain to a definite higher value without intermediate oscillatory behavior.

The reasons for this will be more readily understood by referring again to the diagram of Figure 2. If, as in the case just discussed, the I.-F. input signal is of the form represented at A, the A. G. C. bias will, as in that case, continue at the zero level during the interval $t_0—t_1$ immediately following the increase in input signal magnitude. This is owing to the fact that, for increases in I.-F. input signal magnitude, which result in corresponding increases in the magnitude of the unidirectional control signal developed across diode 4, there will be no modification in the operation of the delay line produced by diodes 24 and 25. At time $t_1$, however, as in the previous instance, the A. G. C. bias appearing at the output of the delay line and applied to the grid of the I.-F. amplifier tube will assume a more negative value corresponding to the unidirectional potential developed across diode 4 during the preceding interval $t_0—t_1$. This value will, as in the previous instance, correspond to the level 16 at C in Figure 2. There will be a corresponding reduction in gain of I.-F. amplifier tube 1, which will tend to reduce the output therefrom to the level 17 as represented at B in Figure 2. In response to this reduced output, the unidirectional potential developed across diode 4 will become substantially less negative. As a result of this, the plates of diodes 24 and 25 will immediately become substantially more positive than their cathodes and the diodes will commence to conduct. This will result in the reduced negative potential, developed across diode 4, being applied immediately through diodes 24 and 25 and connection 14 to the control grid of the I.-F. amplifier tube. This will immediately modify the bias applied to the I.-F. amplifier tube and will further alter its gain, which in turn will produce a further change in the output from the tube and a similar change in the unidirectional potential developed across diode 4. The net result of this action will be that the bias on tube 1 during the interval $t_1—t_2$, instead of being determined as in the previous instance by the unidirectional potential developed across diode 4 during the preceding interval $t_0—t_1$, will now be determined by the potential developed across diode 4 during the interval $t_1—t_2$. During this interval and very shortly after time $t_1$, the output from the I.-F. amplifier tube and the value of the A. G. C. bias will reach equilibrium conditions as represented at 21 and 20 respectively at B and C in Figure 2. Once this condition has been reached, and so long as the magnitude of the input signal to the I.-F. amplifier remains constant, this equilibrium condition will be undisturbed and, as indicated in B and C of Figure 2, the I.-F. output and the A. G. C. bias will continue at the levels 21 and 20 respectively until time $t_4$.

At time $t_4$, when the I.-F. input signal reduces in magnitude, similar changes will take place. However, in this instance, because of the fact that the I.-F. input signal experiences a decrease rather than an increase, the delay line will have no effect whatsoever. As soon as the reduction in input signal takes place, the unidirectional potential developed across diode 4 will be correspondingly reduced, and, since the anodes of diodes 24 and 25 will be rendered more positive than the cathodes, they will conduct and will immediately apply the unidirectional potential appearing across diode 4 to the control grid of the I.-F. amplifier tube as A. G. C. bias corresponding to the level represented by the broken line in C of Figure 2. As a result of this reduction in bias, the gain of the I.-F. amplifier tube will be immediately increased and its output will assume a level corresponding to that represented at 23 in B of Figure 2. So long as the I.-F. input signal magnitude remains constant, the I.-F. output and the A. G. C. bias will remain constant, as indicated respectively at B and C in Figure 2.

In general, in accordance with the foregoing description, it will be desirable to delay the control signal for input signals of increasing amplitude by a certain amount, while utilizing, substantially undelayed, control signals derived from input signals of decreasing amplitude. However, in some instances, it might be found desirable to delay all control signals, but by different amounts. This result is achievable, in accordance with the invention, by merely connecting the by-passing diode or diodes across only a portion of the delay network. Then all signals will be delayed by a fixed amount, but some will be delayed additionally.

Although my invention has been described with reference to but a single embodiment, it will be understood that various of the components shown may be replaced by equivalents in function, as will be apparent to those skilled in the art. Thus, the A. G. C. detector here shown as comprising diode 4, condenser 5 and resistor 6, may be any form of detector suitable for deriving a unidirectional potential, the value of which varies as a function of the level of the output signal of any signal transfer means whose gain is controllable in response to a control signal. The delay line, which is here shown comprising lumped parameters, may be any suitable means for delaying electric wave signals and might for example, at certain frequencies, take the form of a coaxial transmission line. Likewise, diodes 24 and 25 might be replaced by any equivalent unilateral conducting devices. The scope of my invention is, therefore, to be determined only by reference to the appended claims.

I claim:

1. In a pulse signal receiving system including signal transfer means whose gain is controllable in response to a control signal, means for deriving a control signal from said transfer means, and means supplying said control signal to said transfer means to control its gain, said last-named means including a delay circuit for normally delaying said control signal and a unilateral conducting device connected across at least a portion of said delay circuit for rendering said delay circuit ineffectual to delay control signals corresponding to decreases in the output of said transfer means.

2. In a pulse signal receiving system including signal transfer means whose gain is controllable in response to a control signal, means for deriving a control signal from said transfer means, and means supplying said control signal to said transfer means to control its gain, said last-named means including a delay circuit for normally delaying said control signal and a plurality of unilateral conducting devices each connected across at least a portion of said delay circuit for rendering said delay circuit ineffectual to delay control signals corresponding to decreases in the output of said transfer means, means utilizing said undelayed control signal to control the gain of said transfer means whenever the output of said transfer means is decreasing, and means utilizing said delayed control signal to control the gain of said transfer means whenever the output of said transfer means is not decreasing.

3. In a pulse signal receiving system including signal transfer means whose gain is controllable in response to a control signal, means for deriving a control signal from said transfer means, and means supplying said control signal to said transfer means to control its gain, said last-named means including a delay circuit for normally delaying said control signal and a plurality of unilateral conducting devices each connected in shunt with at least a portion of said delay circuit for rendering said delay circuit ineffectual to delay control signals corresponding to decreases in the output of said transfer means.

4. A signal transfer means having input and output terminals and adapted to delay by a predetermined amount signals applied to its input terminals whose amplitude is varying in one sense, and to delay by a different amount signals so applied whose amplitude is varying in the opposite sense, comprising a delay network and at least one unilateral conducting device connected across at least a portion of said network.

5. A signal transfer means having input and output terminals and adapted to delay by a predetermined amount signals applied to its input terminals whose amplitude is varying in one sense, and to delay by a different amount signals so applied whose amplitude is varying in the opposite sense, comprising a delay network and a plurality of unilateral conducting devices each connected across at least a portion of said delay network.

6. A signal transfer means having input and output terminals and adapted to delay by a predetermined amount signals applied to its input terminals whose amplitude is varying in one sense, and to delay by a different amount signals so applied whose amplitude is varying in the opposite sense, comprising a delay network terminated in a suitable impedance adapted to minimize reflections in said network, and at least one unilateral conducting device connected across at least a portion of said network and a portion of said terminating impedance so as effectively to alter the magnitude of said terminating impedance whenever said device conducts.

7. In a pulse signal receiving system including signal transfer means whose gain is controllable in response to a control signal, means for deriving a control signal from said transfer means, and means supplying said control signal to said transfer means to control its gain, said last-named means including a delay circuit for normally delaying said control signal and a unilateral conducting device connected across at least a portion of said delay circuit for modifying the delaying effect thereof for control signal corresponding to increases in the output of said transfer means.

8. In an automatic gain control system, signal transfer means adapted to have its gain controlled in response to a gain-controlling signal, a circuit connected to said signal transfer means for developing a control signal in response to signals in said signal transfer means and for applying said control signal to said signal transfer means to control its gain, said circuit including a delay device having input and output terminals and being normally effective to delay the application of said control signal to said transfer means, and a unilaterally conductive device having a pair of terminals connected respectively to said input and output terminals of said delay device, whereby said unilaterally conductive device is effective, when rendered conductive in response to changes of predetermined polarity in the magnitude of the signal in said transfer means, to by-pass said delay device and thereby substantially to eliminate the delay produced thereby in the application of said control signal to said transfer means.

9. In an automatic gain control system, signal transfer means adapted to have its gain controlled in response to a gain-controlling signal, means responsive to signals in said transfer means for developing a control signal, and means for supplying said control signal to said transfer means to control its gain, said last-named means including a delay device having input and output terminals and being normally effective to delay the application of said control signal to said transfer means, and a unilaterally conductive device connected between said input and ouput terminals, whereby said unilaterally conductive device is effective, when rendered conductive in response to changes of predetermined polarity of said control signal, to by-pass said delay device and thereby eliminate the delay produced thereby in the application of said control signal to said transfer means.

10. An automatic gain control system according to claim 9 and particularly adapted for use in a pulse signal receiver, in which said unilaterally conductive device is connected in such polarity between said input and output terminals of said delay device that it is adapted to be rendered conductive in response to decreases in magnitude of said control signal, whereby it is effective to eliminate substantial delay in the application of said control signal to said transfer means for decreases in magnitude of said control signal.

11. In combination, a signal transfer device having input and output terminals and being normally effective to delay substantially the passage of signals from said input to said output terminals and a unilaterally conductive device having a pair of terminals connected respectively to said input and output terminals of said transfer device, whereby said unilaterally conductive device is effective, when rendered conductive in response to changes of predetermined polarity of signals applied to said input circuit, to by-pass said signal transfer device and to cause signals applied to said input circuit to be transferred to said output circuit without substantial delay.

12. In combinaton, a signal transfer network having input and output terminals and comprising a plurality of inductive elements serially connected between said input and output terminals and a plurality of capacitive elements connected in shunt with reference to said terminals, said elements being thereby effective to delay substantially the passage of signals from said input to said output terminals, and at least a single unilaterally conductive device connected effectively in shunt with at least a portion of one of said inductive elements, whereby said unilaterally conductive device is adapted to be rendered conductive in response to changes of predetermined polarity of signals applied to said input terminals and is thereupon rendered effective to modify the delaying effect of said network upon signals supplied to said input terminals.

13. In combination, a signal transfer device having input and output terminals and comprising a plurality of cascaded sections, at least certain of said sections being effective to delay the passage of signals from said input to said output terminals, and at least a single unilaterally conductive device connected so as to be rendered conductive in response to changes of predetermined polarity of signals applied to said input terminals and so that when thus rendered conductive it is effective to by-pass at least some of said certain sections, whereby it is effective to modify the delay in passage of signals through said transfer device.

14. In an automatic gain control system, signal transfer means adapted to have its gain controlled in response to a gain-controlling signal, a circuit connected to said signal transfer means for developing a control signal in response to signals in said signal transfer means and for applying said control signal to said signal transfer means to control its gain, said circuit including a delay device for delaying the application of said control signal to said signal transfer means, controllably conductive means connected effectively in parallel across at least a portion of said delay device for rendering said delay device controllably ineffectual to delay the application of said control signal to said transfer means, and means for utilizing said control signal to control the conductivity of said controllably conductive means.

15. A system according to claim 14 in which said means for utilizing said control signal to control the conductivity of said controllably conductive means is constructed and arranged to render said controllably conductive means conductive in response to changes of one polarity in said control signal and to render said controllably conductive means non-conductive in response to changes of the opposite polarity in said control signal.

16. A system according to claim 14 in which said means for utilizing said control signal to control the conductivity of said controllably conductive means is constructed and arranged to render said controllably conductive means conductive in response to increases in said control signal and to render said controllably conductive means non-conductive in response to decreases in said control signal.

17. In an automatic gain control system, signal transfer means adapted to have its gain controlled in response to a gain-controlling signal, a circuit connected to said signal transfer means for developing a control signal in response to signals in said signal transfer means and for applying said control signal to said signal transfer means to control its gain, said circuit including serially a delay device for delaying the application of said control signal to said signal transfer means, controllably conductive means connected in parallel across at least a portion of said delay device for rendering said delay device controllably ineffective to delay the application of said control signal to said signal transfer means, and means responsive to variations in the difference in potential developed across at least a portion of said delay device for controlling the conductivity of said controllably conductive means.

18. A system according to claim 17 in which said means responsive to variations in the difference in potential developed across at least a portion of said delay device for controlling the conductivity of said controllably conductive device is constructed and arranged so as to render said controllably conductive device conductive whenever said difference in potential exceeds a predetermined value and to render said controllably conductive device non-conductive whenever said difference in potential is less than said predetermined value.

19. In an automatic gain control system, signal transfer means adapted to have its gain controlled in response to a gain-controlling signal, a circuit connected to said signal transfer means for developing a control signal in response to signals in said signal transfer means, a first connection for applying said control signal to said signal transfer means to control its gain, a second connection for applying said control signal to said signal transfer means to control its gain, a delay device included serially in one of said connections for delaying the application of said control signal through said one connection to said signal transfer means, a controllably conductive device included in at least one of said connections for rendering said connection controllably effectual to supply said control signal to said signal transfer means, and means for utilizing said control signal to control the conductivity of said controllably conductive device.

20. In an automatic gain control system, signal transfer means adapted to have its gain controlled in response to a gain-controlling signal, a circuit connected to said signal transfer means for developing a control signal in response to signals in said signal transfer means, means for delaying said control signal to yield a delayed control signal, and a circuit responsive to the output from said signal transfer means for selectively applying said delayed and undelayed control signals to said signal transfer means to control its gain, said last-named circuit being responsive to decreases in the output from said transfer means to apply said undelayed control signal to control the gain of said transfer means and being responsive to increases in the output from said transfer means to apply said delayed control signal to control the gain of said transfer means.

DAVID E. SUNSTEIN.

REFERENCES CITED

The following references are of record in the file of this patent:

UNITED STATES PATENTS

| Number | Name | Date |
|---|---|---|
| 2,077,466 | Dreyer, Jr. | Apr. 20, 1937 |
| 2,227,056 | Blumlein et al. | Dec. 31, 1940 |
| 2,255,683 | Singer | Sept. 9, 1941 |

FOREIGN PATENTS

| Number | Country | Date |
|---|---|---|
| 478,734 | Great Britain | Jan. 20, 1938 |